(12) United States Patent
Tiwari et al.

(10) Patent No.: US 11,468,725 B2
(45) Date of Patent: Oct. 11, 2022

(54) METHOD FOR DOOR OPEN/CLOSE DETECTION

(71) Applicant: Carrier Corporation, Palm Beach Gardens, FL (US)

(72) Inventors: Ankit Tiwari, South Windsor, CT (US); Yuri Novozhenets, Pittsford, NY (US); Pedro Fernandez-Orellana, Shanghai (CN); Kunal Srivastava, Manchester, CT (US); Adam Kuenzi, Silverton, OR (US)

(73) Assignee: UNITED TECHNOLOGIES RESEARCH CENTER (CHINA) LTD, Shanghai (CN)

( * ) Notice: Subject to any disclaimer, the term of this patent is extended or adjusted under 35 U.S.C. 154(b) by 51 days.

(21) Appl. No.: 17/049,898

(22) PCT Filed: Apr. 23, 2019

(86) PCT No.: PCT/US2019/028671
§ 371 (c)(1),
(2) Date: Oct. 22, 2020

(87) PCT Pub. No.: WO2019/209797
PCT Pub. Date: Oct. 31, 2019

(65) Prior Publication Data
US 2021/0241562 A1    Aug. 5, 2021

(30) Foreign Application Priority Data

Apr. 25, 2018 (CN) .......................... 201810383071.2

(51) Int. Cl.
*G07C 9/28* (2020.01)
*H04B 17/318* (2015.01)
(Continued)

(52) U.S. Cl.
CPC ........... *G07C 9/28* (2020.01); *G07C 9/00309* (2013.01); *H04B 17/318* (2015.01); *H04R 1/222* (2013.01);
(Continued)

(58) Field of Classification Search
CPC ....................................................... G07C 9/00
See application file for complete search history.

(56) References Cited

U.S. PATENT DOCUMENTS 8,854,188 B2 * 10/2014 Stewart .............. G06K 7/10346
455/41.1
8,907,763 B2   12/2014 Pineau et al.
(Continued)

FOREIGN PATENT DOCUMENTS

CN     202117430 U    1/2012
CN     104424676 A    3/2015
EP     3098784 A2    11/2016

OTHER PUBLICATIONS

Notification of Transmittal of the International Search Report for Application No. PCT/US2019/028671; Report Completed Date: Aug. 2, 2019; dated Aug. 30, 2019; 5 pages.
(Continued)

*Primary Examiner* — K. Wong
(74) *Attorney, Agent, or Firm* — Cantor Colburn LLP (57) ABSTRACT

A method of detecting passage by an individual carrying a mobile device past an impediment operably connected to an access control is provided. The method including: detecting positional data of a mobile device; transmitting an access request from the mobile device to an access control operably connected to an impediment; detecting at least one of a sound from the impediment and a motion of the impediment; and determining that an individual carrying the mobile device has moved past the impediment in response to at least
(Continued)

one of the sound from the impediment, the motion of the impediment, and the positional data of the mobile device.

19 Claims, 3 Drawing Sheets

(51) Int. Cl.
    *H04W 4/33*     (2018.01)
    *H04W 4/80*     (2018.01)
    *G07C 9/00*     (2020.01)
    *H04R 1/22*     (2006.01)
    *H04W 4/02*     (2018.01)

(52) U.S. Cl.
    CPC ............. *H04W 4/025* (2013.01); *H04W 4/33* (2018.02); *H04W 4/80* (2018.02); *G07C 2009/00769* (2013.01); *H04R 2201/40* (2013.01)

(56) References Cited

U.S. PATENT DOCUMENTS

| | | | | |
|---|---|---|---|---|
| 9,244,152 | B1* | 1/2016 | Thiagarajan | H04W 64/00 |
| 9,355,556 | B2* | 5/2016 | Schockmel | G08C 19/00 |
| 9,384,607 | B1* | 7/2016 | Copeland | G07C 9/28 |
| 9,508,206 | B2 | 11/2016 | Ahearn et al. | |
| 9,524,594 | B2* | 12/2016 | Ouyang | G07C 9/27 |
| 9,557,719 | B2 | 1/2017 | Liu et al. | |
| 9,589,402 | B2* | 3/2017 | Raina | H04W 12/00 |
| 9,721,413 | B2 | 8/2017 | Dumas et al. | |
| 9,961,489 | B2* | 5/2018 | Elias | H04L 63/0861 |
| 10,163,288 | B2* | 12/2018 | Troesch | G07C 9/00309 |
| 10,257,708 | B1* | 4/2019 | Kamkar | G07C 9/00571 |
| 2014/0229385 | A1 | 8/2014 | Neafsey | |
| 2015/0109098 | A1 | 4/2015 | Singh | |
| 2015/0120598 | A1 | 4/2015 | Fedell et al. | |
| 2015/0279132 | A1 | 10/2015 | Perotti | |
| 2015/0329121 | A1 | 11/2015 | Lim et al. | |
| 2016/0248748 | A1 | 8/2016 | Catering et al. | |
| 2016/0315723 | A1* | 10/2016 | Koriyama | H04L 12/1845 |
| 2017/0032597 | A1 | 2/2017 | Johnson | |
| 2017/0061717 | A1 | 3/2017 | Ouyang et al. | |
| 2017/0148243 | A1 | 5/2017 | Shin et al. | |
| 2017/0256107 | A1 | 9/2017 | Trani | |
| 2017/0287248 | A1 | 10/2017 | Aase | |

OTHER PUBLICATIONS

Written Opinion of the International Searching Authority No. PCT/US2019/028671; Report Completed Date: Aug. 2, 2019; Report dated Aug. 30, 2019; 8 pages.

* cited by examiner

METHOD FOR DOOR OPEN/CLOSE DETECTION

CROSS-REFERENCE TO RELATED APPLICATIONS

This application is a National Stage Application of International Application No. PCT/US2019/028671 filed Apr. 23, 2019, which claims the benefit of Chinese Application No. 201810383071.2 filed Apr. 25, 2018, the disclosures of which are incorporated herein by reference in their entirety.

BACKGROUND

The subject matter disclosed herein generally relates to the field of access control systems, and more particularly to an apparatus and method for operating access control systems.

Existing access controls may allow an individual to unlock rooms via a mobile device however it is difficult to determine when the individual actually enters the room after it has been unlocked.

BRIEF SUMMARY

According to one embodiment, a method of detecting passage by an individual carrying a mobile device past an impediment operably connected to an access control is provided. The method including: detecting positional data of a mobile device; transmitting an access request from the mobile device to an access control operably connected to an impediment; detecting at least one of a sound from the impediment and a motion of the impediment; and determining that an individual carrying the mobile device has moved past the impediment in response to at least one of the sound from the impediment, the motion of the impediment, and the positional data of the mobile device.

In addition to one or more of the features described above, or as an alternative, further embodiments may include detecting positional data of the mobile device further includes: detecting a location of the mobile device relative to the impediment prior to detecting at least one of the sound from the impediment and the motion of the impediment; and detecting a location of the mobile device relative to the impediment after detecting at least one of the sound from the impediment and the motion of the impediment.

In addition to one or more of the features described above, or as an alternative, further embodiments may include that the impediment is a door and the access control is a door lock.

In addition to one or more of the features described above, or as an alternative, further embodiments may include that the sound from the impediment is detected by one or more microphones.

In addition to one or more of the features described above, or as an alternative, further embodiments may include that the one or more microphones are located in at least one of the mobile device and access control.

In addition to one or more of the features described above, or as an alternative, further embodiments may include that the motion of the impediment is detected by a sensor operably connected to the impediment.

In addition to one or more of the features described above, or as an alternative, further embodiments may include that the motion of the impediment is detected by a sensor located on the impediment.

In addition to one or more of the features described above, or as an alternative, further embodiments may include that the sensor is located within the access control on the impediment.

In addition to one or more of the features described above, or as an alternative, further embodiments may include that the detecting positional data of a mobile device further includes: determining a distance between the mobile device and the access control in response to a signal strength of a wireless signal emitted by at least one of the mobile device and the access control.

In addition to one or more of the features described above, or as an alternative, further embodiments may include that the wireless signal is Bluetooth.

In addition to one or more of the features described above, or as an alternative, further embodiments may include: generating an access granted and entry made event in response to the determination that an individual carrying the mobile device has moved past the impediment in response to at least one of the sound from the impediment, the motion of the impediment, and the positional data of the mobile device.

According to another embodiment, a method of detecting lack of passage by an individual carrying a mobile device past an impediment operably connected to an access control is provided. The method including: detecting positional data of a mobile device; transmitting an access request from the mobile device to an access control operably connected to an impediment; detecting at least one of a sound from the impediment and a motion of the impediment; and determining that an individual carrying the mobile device has not moved past the impediment in response to the positional data of the mobile device.

In addition to one or more of the features described above, or as an alternative, further embodiments may include that the determination that an individual carrying the mobile device has not moved past the impediment in response to the positional data of the mobile device is made a selected period of time after at least one of a sound from the impediment and a motion of the impediment is detected.

In addition to one or more of the features described above, or as an alternative, further embodiments may include: generating an access granted but no entry made event in response to the determination that an individual carrying the mobile device has not moved past the impediment in response to the positional data of the mobile device.

According to another embodiment, a method of detecting passage by an individual carrying a mobile device past an impediment operably connected to an access control is provided. The method including: detecting positional data of a mobile device; transmitting an access request from the mobile device to an access control operably connected to an impediment; detecting neither a sound from the impediment nor a motion of the impediment; and determining that an individual carrying the mobile device has moved past the impediment in response to the positional data of the mobile device.

In addition to one or more of the features described above, or as an alternative, further embodiments may include: generating a door held open event in response to the determination that an individual carrying the mobile device has moved past the impediment in response to the positional data of the mobile device.

Technical effects of embodiments of the present disclosure include tracking a location, position, and movement of a mobile device relative to access controls and activating a microphone on the mobile device to confirm that an individual carrying the mobile device has opened a door.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
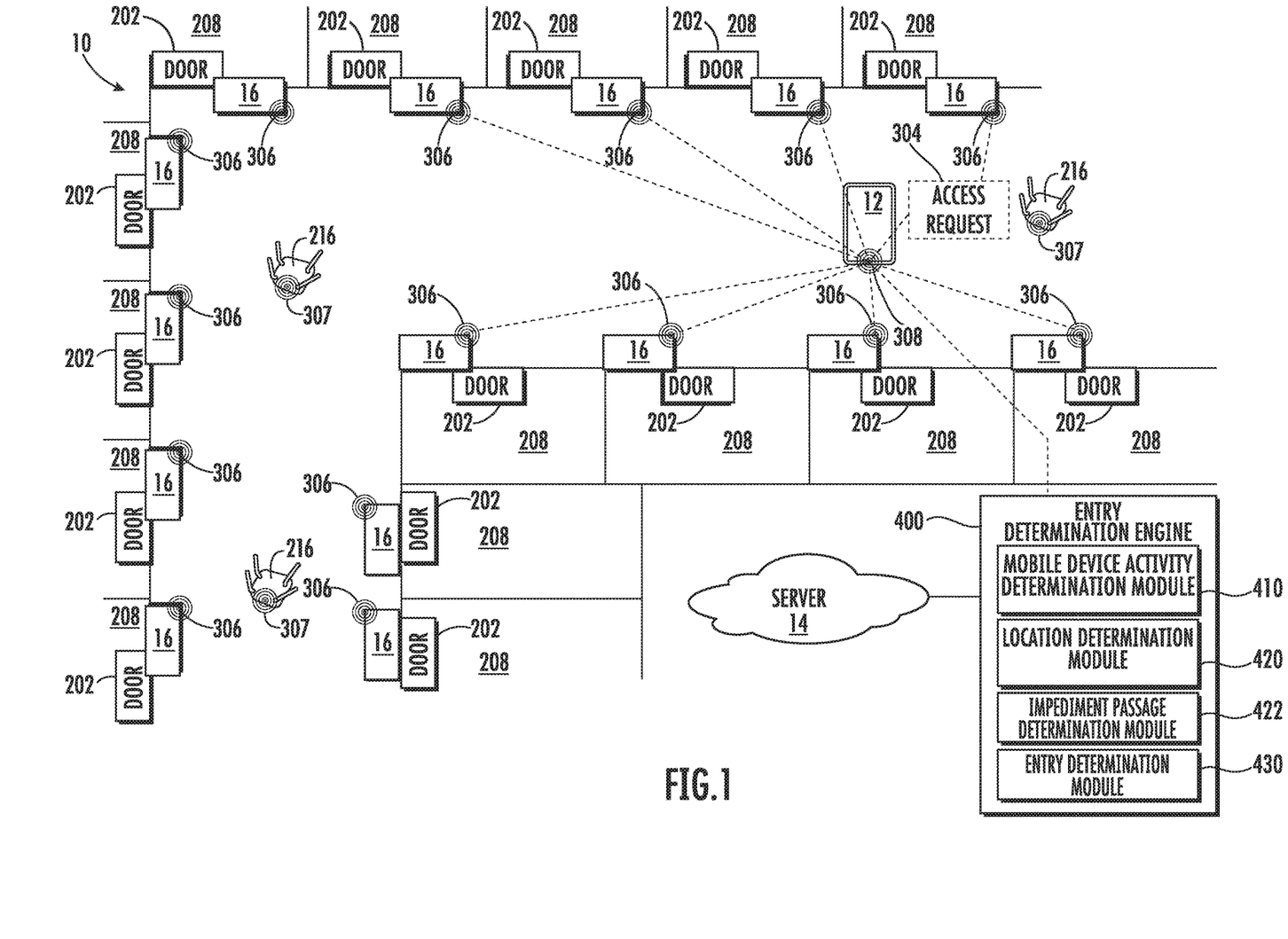
FIG. 1 illustrates a general schematic system diagram of an access control system, in accordance with an embodiment of the disclosure.

FIG. 1 schematically illustrates an access control system 10. The system 10 generally includes a mobile device 12, a server 14, a wireless access protocol device 216, and an access control 16. The access control system 10 may include any number of access controls 16. It should be appreciated that, although particular systems are separately defined in the schematic block diagrams, each or any of the systems may be otherwise combined or separated via hardware and/or software. In the illustrated embodiment, the access controls 16 may control access through a door 202 to a room 208. The access control system 10 may include any number of doors 202 and rooms 208. Further, there may be multiple doors 202 and access controls 16 for each room 208. It is understood that while the access control system 10 utilizes a door 202 and room 208 system for exemplary illustration, embodiments disclosed herein may be applied to other access control systems restricting access through an access control impediment such as, for example, elevators, turnstiles, safes, garage, etc. The door 202 may be the impediment of the example illustrated in FIG. 1, and unlocking the door 202 through the access control 16 removes the impediment and allows an individual to proceed past the impediment and into the room 208.

A mobile device 12 belonging to an individual may be granted access to one or more access controls 16 (e.g. the door lock on an office or hotel room assigned to the individual). In one example, when an individual begins working at a new building their mobile device 12 will be granted access to particular rooms 208 where they are allowed to enter and/or work. In another example, when an individual checks into the hotel room their mobile device 12 will be granted access to a room 208. There may be one or more mobile devices 12 assigned to a room 208 (e.g. a husband and a wife in a hotel; or multiple workers in a collaborative workspace), thus embodiments disclosed herein may apply to multiple mobile devices 12 per room 208. An individual may utilize their mobile device 12 to unlock and/or lock the access control 16 operably connected to their assigned room 208 through an access request 304. The mobile device 12 may store credentials to unlock and/or lock the access control 16. Some credentials may be used for multiple access controls 16 if there are multiple access controls 16 for a single assigned room 208 or the individual is assigned access to multiple rooms 208. For example, an access control 16 operably connected to an individual's hotel room and an access control 16 operably connected to a hotel pool may respond to the same credential. Other credentials may be specific to a single access control 16.

Wireless communication may occur between the access control 16 and the mobile device 12 via short range wireless communication, such as for example Wi-Fi, Bluetooth, ZigBee, infrared, or any other short-range wireless communication method known to one of skill in the art. In an embodiment, the short-range wireless communication is Bluetooth. The mobile device 12 may have to be within a selected range of the access control 16 in order to utilize short-range wireless communication. For example, the selected range may be manually set by an individual as a chosen range or automatically set based on the limitations of hardware associated with the mobile device 12 and/or the access control 16.

Each access control 16 is a wireless-capable, restricted-access, or restricted-use device such as wireless locks, access control readers for building entry, and other restricted-use machines. The mobile device 12 submits credentials to the access controls 16, thereby selectively permitting a user to actuate (i.e., access or activate) functions of the access controls 16. A user may, for example, submit a credential to an electromechanical lock to unlock it, and thereby gain access to a room 208.

The mobile device 12 may transmit an access request 304 to the access control 16 by short-range radio transmission when the mobile device 12 is placed proximate the access control 16. The mobile device 12 is a wireless capable handheld device such as a smartphone that is operable to communicate with the server 14 and the access controls 16. The server 14 may provide credentials and other data to the access control 16, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data. The access controls 16 may communicate directly with the server 14 or through the wireless access protocol devices 216 or through mobile device 12.

The system 10 may include an entry determination engine 400 configured to confirm passage of an individual carrying the mobile device 12 past the impediment (e.g., door 202) operably connected to the access control 16. The entry determination engine 400 is comprised of modules including a mobile device activity determination module 410; a location determination module 420; an impediment passage determination module 422; and an entry determination module 430. Each module 410, 420, 422, 430 may be located on either the mobile device 12, access control 16 or the server 14. Alternatively, the modules 410, 420, 422, 430 may be distributed between the mobile device 12, access control 16, and the server 14.

The mobile device activity determination module 410 uses an inertial measurement unit (IMU) sensor 57 (see FIG. 2) on the mobile device 12 to detect a position of the mobile device 12 (e.g., how a mobile device 12 is carried by the individual: in a hand of an individual, a back pocket of an individual, a front pocket of an individual) and an activity of an individual carrying the mobile device 12 (e.g., sitting, standing, moving, slowing, accelerating, and stopping). The position or activity of the mobile device 12 may be indicative of intent of the individual. The IMU sensor 57 may be composed of one or more sensors including but not limited to an accelerometer and a light sensor. For example, the light sensor on the mobile device 12 may be used to determine if the mobile device 12 is in a pocket/bag or in hand and this information may be used to adjust for the signal strength. The mobile device activity determination module 410 also tracks interactions between the mobile device 12 and each access control 16. For example, each time the mobile device 12 transmits an access request to an access control 16, the access control 16 will be saved or book marked.

The mobile device location determination module 420 is configured to detect positional data of the mobile device 12. The position data may include the location of the mobile device 12 at various granularity levels including but not limited to a geographical coordinate, a building where the mobile device 12 is located, a section of the building where the mobile device 12 is located, a floor in the building where the mobile device 12 is located, a hallway in the building where the mobile device 12 is located, a room where the mobile device 12 is located, and a distance between the mobile device 12 and each of the access controls 16. For example, from the distance between the mobile device 12 and each of the access controls 16, a location within the system 10 (i.e. a building) may be determined, since the location of each access controls 16 is already known. The mobile device location determination module 420 may also be configured to further refine the location of the mobile device 12 in response to the position of the mobile device 12 detected by the mobile device activity determination module 410 (e.g., a different location offset is applied if the mobile device 12 is in back pocket vs. front pocket of the individual carrying the mobile device 12). Knowing the position of the mobile device 12 is advantageous because the human body can cause interference in signal strength for wireless signals (e.g., Wi-Fi, Bluetooth, etc.), thus having the mobile device 12 in front or back pocket may cause the mobile device 12 to be in direct line of sight of the access control 16 or position an individual's body in between the mobile device 12 and the access control 16. Also advantageously, knowing the position of the mobile device 12 may help determine intent.

The impediment passage determination module 422 may utilize at least one of a microphone 59 (see FIG. 2) on the mobile device 12, a microphone 259 on the access control 16, and a IMU sensor 257 located operably connected to the access control. The microphones 59, 259 are configured to learn and detect the sound of an impediment associated with the access control 16 being moved when the access control is actuated. For example, the microphones 59, 259 may be configured to learn and detect the sound of the door 202 opening or closing. The microphones 59, 259 may use machine learning to learn the sound of the door 202 opening or closing. Different machine learning models may be utilized. In a first example, a pre-trained model trained during a design period can reside on a device/server, which detects the sound of opening, closing or other impediment sound. In a second example, a pre-trained model can be suitably tuned based on a few examples during commissioning phase to accommodate different types of impediments. The system 10 may utilize a microphone 59 in the mobile device 12 or a microphone 259 located proximate the door 202 or other impediment operably connected the access control 16. The microphone 259 may also be located within the access control 16. In one example, sound of the door 202 opening or closing may be used to help confirm that an individual has passed through the door 202 after transmitting an access request to unlock the door 202. Additionally, the microphones 59, 259 may be provided with information identifying what sound to expect to detect from an impediment associated with an access control 16. For example, if the microphone 259 is located in or proximate a specific access control 16 the microphone 259 may be programed to always detect the sound from the same impediment associated with the specific access control 16. In another example, if the microphone 59 is located within the mobile device 12, then the mobile device 12 may receive information from the server 14 and/or the wireless signal 306 from a specific access control 16 on what sound to expect to detect from the impediment associate with the specific access control 16.

The IMU sensor 257 may be operably connected to the impediment associated with the access control 16 to determine whether the impediment has moved after actuating the access control 16. In one example, the IMU sensor 257 may be located on the door 202 to detect motion of the door 202. The IMU sensor 257 is in electronic communication with the access control 16, The IMU 275 may be located within the access control 16 and thus the access control 16 may be located on the door 202.

The entry determination module 430 is configured to determine whether an individual has moved past an impediment operably connected to access control 16 in response to at least one of the position of the mobile device 12, the activity of an individual carrying the mobile device 12, interactions between the mobile device 12 and access controls 16, the positional data of the mobile device 12, sound detected from the impediment operably connected to the access control 16, and motion detected from the impediment operably connected to the access control 16. For instance, if an access control 16 receives an access request to unlock a door 202, it may be confirmed that the individual carrying the mobile device 12 has entered the door by detecting sound of the door 202 opening and confirming a location change of the mobile device 12 from a hallway into the room 208

The positional data of the mobile device 12 may be detected using one or more methods and apparatus. The positional data may be collected by the mobile device 12 and/or the server 14. The positional data may include a location of the mobile device 12 and/or a movement of mobile device 12 that is a derivative of a location of the mobile device 12, such as, for example, velocity, acceleration, jerk, jounce, snap . . . etc. The mobile device 12 may a determine positional data by the GPS 48, by the IMU sensor 57, wireless signal strength, and/or by triangulating wireless signals 307 from the wireless access protocol device(s) 216 or wireless signals 306 from the access control(s) 16. The location of the mobile device 12 may also be detected through triangulation of wireless signals emitted from the mobile device 12 or signal strength of wireless signals emitted from the mobile device 12. The location of the mobile device 12 may be detected using any other desired and known location detection/position reference means.

The access control 16 may be configured to continuously advertise a wireless signal 306. The advertisement is the access control 16 declaring its presence to any nearby listening device and if it is a connectable advertisement it is an opportunity for another device (i.e., nearby mobile device 12) to connect to the access control 16. For example, the wireless signal 306 of the access control 16 may be a Bluetooth signal. The mobile device 12 is configured to detect the wireless signal 306 and determine positional data of the mobile device 12 in response to a signal strength of the wireless signal 306.

Positional data of the mobile device 12 may also be determined using the wireless access protocol device 216. The wireless access protocol device 216 may be configured to advertise a wireless signal 307. The advertisement is the wireless access protocol device 216 declaring its presence to any nearby listening device and if it is a connectable advertisement it is an opportunity for another device (i.e., nearby mobile device 12) to connect to the wireless access protocol device 216. For example, the wireless signal 307 of the wireless access protocol device 216 may be a Wi-Fi signal. The mobile device 12 is configured to detect the wireless signal 307 and determine a positional data of the mobile device 12 in response to a signal strength of the wireless signal 307.

Positional data of the mobile device 12 may also be determined using the wireless access protocol device 216 and/or the access controls 16 to detect a wireless signal 308 advertised by the mobile device 12. The mobile device 12 may be configured to advertise a wireless signal 308. The advertisement is the mobile device 12 declaring its presence to any nearby listening device and if it is a connectable advertisement it is an opportunity for another device (i.e., access control 16 or wireless access protocol device 216) to detect this advertisement and triangulate the location of the mobile device 12. The wireless access protocol device 216 and/or the access controls 16 are configured to detect the wireless signal 308 and determine a positional data of the mobile device 12 in response to a signal strength of the wireless signal 308. The location of the mobile device 16 may be triangulated by relaying up to the location determination module 420 the strength of each wireless signal 308 detected and then the location determination module 420 can triangulate the position.

Wireless signal interaction data between the mobile device 12 and at least one of the access device 16 and the wireless access protocol device 216 may transmitted to the server 14 to determine positional data. In an embodiment, the location determination module 420 may be located on the server 14 and may be used to determine positional data. The server 14 may use signal strength detected between the mobile device 12, access controls 16, and the wireless access protocol device 216 to determine positional data of the mobile device 12.

Figure 2:
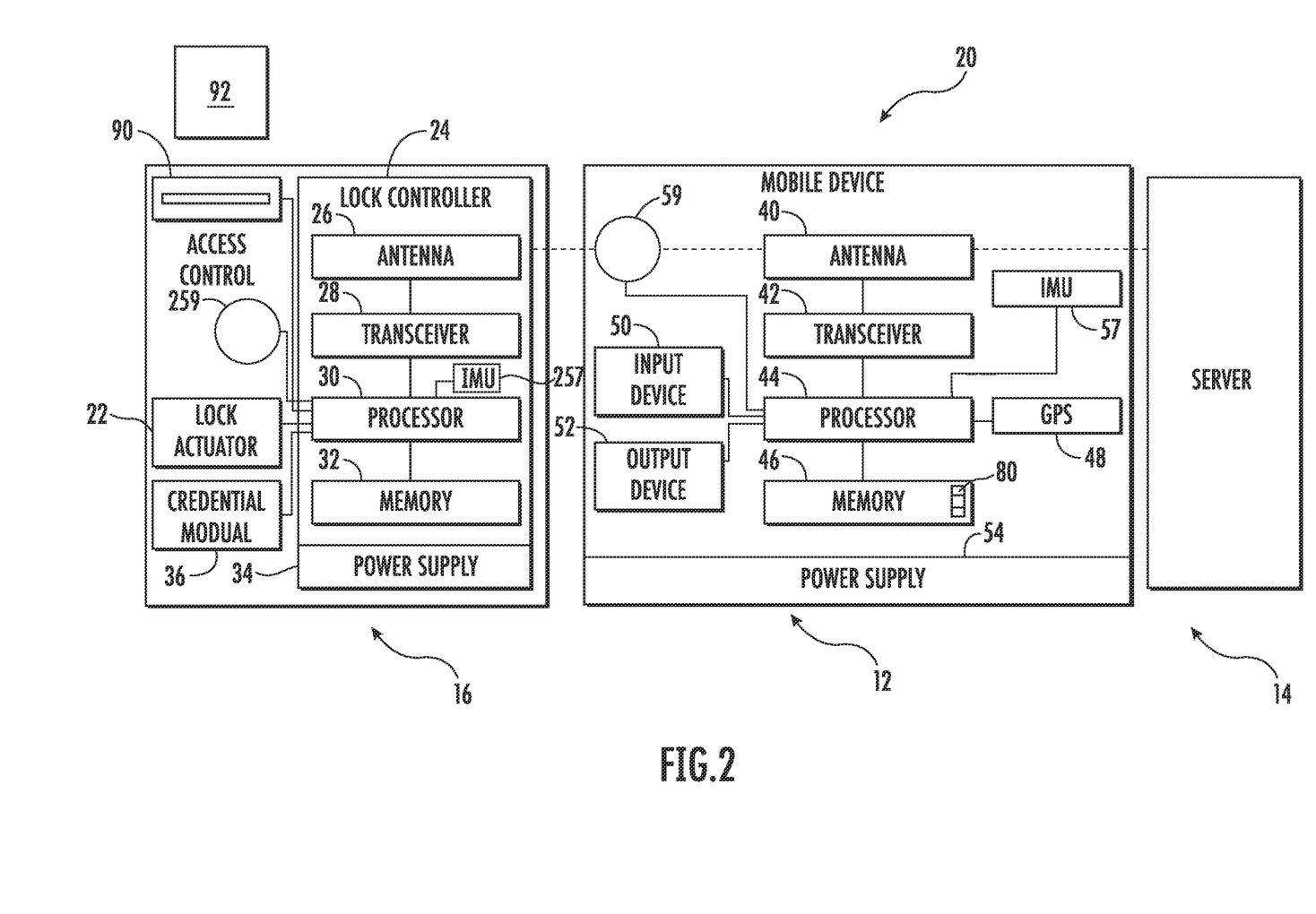
FIG. 2 illustrates a block diagram of an access control, mobile device and server of the access control system of FIG. 1, in accordance with an embodiment of the disclosure.

Referring now to FIG. 2 with continued reference to FIG. 1. FIG. 2 shows a block diagram of an example electronic lock system 20 includes the access control 16, the mobile device 12, and the server 14. The access control 16 generally includes a lock actuator 22, a lock controller 24, a lock antenna 26, a lock transceiver 28, a lock processor 30, a lock memory 32, a lock power supply 34, a lock card reader 90, and a credential module 36.

The access control 16 may have essentially two readers, one reader 90 to read a physical key card 92 and the credential module 36 to communicate with the mobile device 12 via the lock processor 30 and the transceiver 28 and antenna 26. In addition to utilizing the mobile device 12 to actuate the access control 16, a physical key card 92 may also be used to actuate the access control 16 by being inserted into the access control 16 for the access control 16 to read the physical key card 92 (e.g. a magnetic strip on an encoded card 92). The physical key card 92 is capable of being encoded with card data, such as, for example, a magnetic strip or RFID chip. The card data may include credentials to grant access to a specific access control 16. For example, for a period the mobile device 12 may be granted access to a specific access control 16, such as, for example, a period of stay/employment for the individual possessing the mobile device 12.

The access control 16 is responsive to credentials from the mobile device 12, and may, for example, be the lock of a turnstile or a door lock. Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately. In an embodiment, the access control 16 is composed of separate components—a reader (e.g., transceiver 28 and/or antenna 26) at a door 202, a processor 30 that gets the credential from the reader, and then a lock actuator 22 that gets a signal from the processor 30 to actuate an electromechanical lock.

The lock transceiver 28 is capable of transmitting and receiving data to and from at least one of the mobile device 12, the wireless access protocol device 216, and the other access controls 16. The lock transceiver 28 may, for instance, be a near field communication (NFC), Bluetooth, infrared, ZigBee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

As described above, the access control 16 may be in communication with a microphone 259 and an IMU sensor 257. The microphone 259 is configured to detect sound and may be located within the access control 16 or separate from the access control 16 while in operably communication with the access control 16. For example, the microphone 259 located proximate the door 202 and outside of the access control 16. The IMU sensor 257 is configured to detect motion of the door 202 and is operably connected to the door 202. The IMU sensor 257 may be a sensor such as, for example, an accelerometer, a gyroscope, or a similar sensor known to one of skill in the art. The IMU sensor 257 may be located on the door 202. The IMU sensor 257 may be located on the door 202 and within the access control 16.

The mobile device 12 generally includes a key antenna 40, a key transceiver 42, a key processor 44, a key memory 46, a GPS receiver 48, an input device 50, an output device 52, a key power supply 54, a microphone 59, and an IMU sensor 57. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12. The microphone 59 is configured to detect sound. The IMU sensor 57 may be a sensor such as, for example, an accelerometer, a gyroscope, or a similar sensor known to one of skill in the art.

Figure 3:
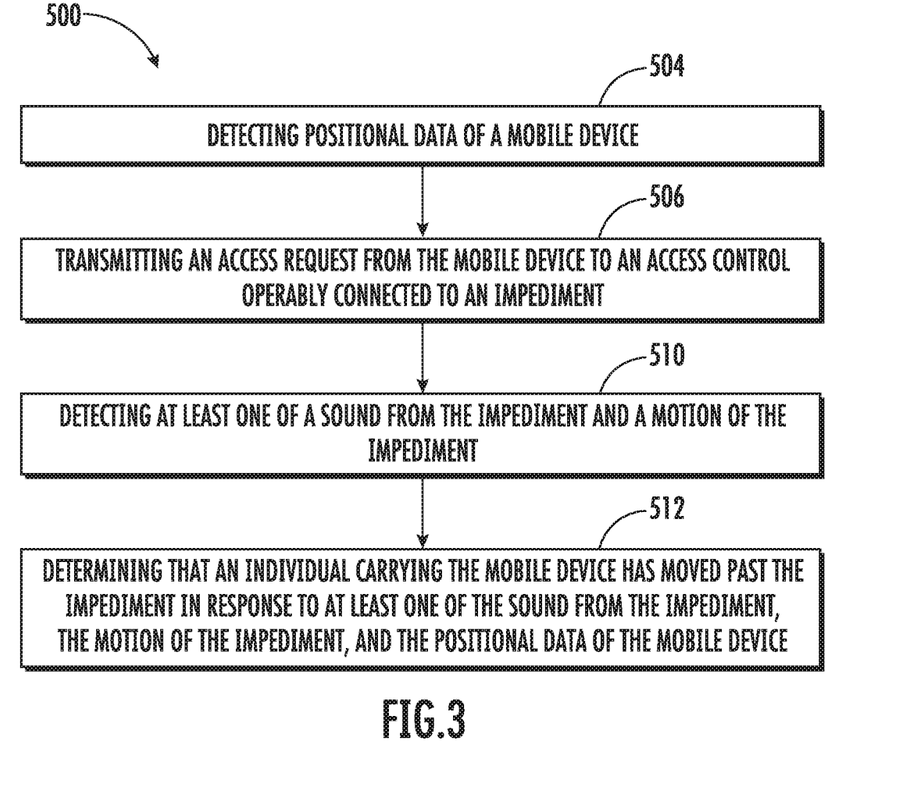
FIG. 3 is a flow diagram illustrating a method of detecting passage by an individual carrying a mobile device past an impediment operably connected to an access control, according to an embodiment of the present disclosure.

Referring now to FIG. 3 with continued reference to FIGS. 1-2. FIG. 3 shows a flow chart of a method 500 of detecting passage by an individual carrying a mobile device 12 past an impediment operably connected to an access control 16. The method 500 may be performed by the mobile device 12, access control 16, and/or the server 14. At block 504, positional data of a mobile device 12 is detected. The positional date of the mobile device 12 may be detected by determining a distance between the mobile device 12 and the access control 16 in response to a signal strength of a wireless signal emitted by at least one of the mobile device 12 and the access control 16. In an embodiment, the wireless signal is Bluetooth.

At block 506, an access request is transmitted from the mobile device 12 to an access control 16 operably connected to an impediment. In an embodiment, the impediment is a door 202 and the access control 16 is a door lock. The access control 16 may be actuated in response to the access request. At block 510, at least one of a sound from the impediment and a motion of the impediment is detected. The sound from the impediment may be detected by one or more microphones 59, 259. The one or more microphones 59, 259 are located in at least one of the mobile device 12 and access control 16. The motion of the impediment is detected by a sensor 57, 257 operably connected to the impediment (e.g., sensor on a door hinge or door stop) or located on the impediment.

At block 512, it is determined that an individual carrying the mobile device 12 has moved past the impediment in response to at least one of the sound from the impediment, the motion of the impediment, and the positional data of the mobile device 12. An 'access granted and entry' made event may be generated in response to the determination that an individual carrying the mobile device has moved past the impediment in response to at least one of the sound from the impediment, the motion of the impediment, and the positional data of the mobile device. The positional data may include a location of the mobile device 12 relative to the impediment detected prior to actuating the access control 16 (i.e., detecting at least one of the sound from the impediment and the motion of the impediment) and a location of the mobile device 12 detected relative to the impediment after actuating the access control 16 (i.e., detecting at least one of the sound from the impediment and the motion of the impediment). Advantageously, by detecting the location of the mobile device 12 both before and after the actuation of the access control 16 (i.e., detecting at least one of the sound from the impediment and the motion of the impediment), it may be determined if the individual carrying the mobile device 12 has moved after the actuation of the access control 16 (e.g., the individual has moved past the door 202 and into the room 208).

In the event that at least one of a sound from the impediment and a motion of the impediment is detected but the positional dated indicates that the individual carrying the mobile device 12 has not moved past the impediment then an 'access granted but no entry' made event may be generated. The determination that the individual carrying the mobile device 12 has not moved past the impediment may be made a selected period of time after at least one of a sound from the impediment and a motion of the impediment is detected. For instance, if a the mobile device 12 is not detected to have moved past the impediment 60 seconds after the impediment is heard opening then it may be determined that the mobile device 12 did not move past the impediment. In the event that neither a sound from the impediment and a motion of the impediment is detected but the positional dated indicates that the individual carrying the mobile device 12 has moved past the impediment then a 'door held open event' may be generated. For example, a person may be holding a door open for individual carrying the mobile device 12 and the person opened the door 202 when the mobile device 12 was far enough away from the door 202 such that the door 202 opening sound could not be heard by the mobile device 12.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of detecting passage by an individual carrying a mobile device past an impediment operably connected to an access control, the method comprising:
   receiving an access request from a mobile device at an access control operably connected to an impediment;
   detecting, at the access control, positional data of the mobile device;
   detecting, at the access control, at least one of a sound from the impediment and a motion of the impediment; and
   determining, at the access control, that an individual carrying the mobile device has moved past the impediment based on at least one of the sound from the impediment, the motion of the impediment, and the positional data of the mobile device.

2. The method of claim 1, wherein detecting the positional data of the mobile device comprises:
   detecting a location of the mobile device relative to the impediment prior to detecting at least one of the sound from the impediment and the motion of the impediment; and
   detecting a location of the mobile device relative to the impediment after detecting at least one of the sound from the impediment and the motion of the impediment.

3. The method of claim 1, wherein the impediment is a door and the access control is a door lock.

4. The method of claim 1, wherein the sound from the impediment is detected by one or more microphones.

5. The method of claim 4, wherein the one or more microphones are located in the access control.

6. The method of claim 1, wherein the motion of the impediment is detected by a sensor operably connected to the impediment.

7. The method of claim 1, wherein the motion of the impediment is detected by a sensor located on the impediment.

8. The method of claim 7, wherein the sensor is located within the access control and the access control is located on the impediment.

9. The method of claim 1, wherein detecting the positional data of the mobile device comprises:
   determining a distance between the mobile device and the access control in response to a signal strength of a wireless signal emitted by at least one of the mobile device and the access control.

10. The method of claim 9, wherein the wireless signal is Bluetooth.

11. The method of claim 1, further comprising:
    generating, with the access control, an access granted and entry made event in response to the determination that an individual carrying the mobile device has moved past the impediment.

12. The method of claim 1, further comprising:
    determining that an individual carrying the mobile device has not moved past the impediment based on the positional data of the mobile device.

13. The method of claim 12, wherein the determination that an individual carrying the mobile device has not moved past the impediment in response to the positional data of the mobile device is made a selected period of time after at least one of the sound from the impediment and the motion of the impediment is detected.

14. The method of claim 13, further comprising:
    generating, at the access control, an access granted but no entry made event in response to the determination that an individual carrying the mobile device has not moved past the impediment.

15. The method of claim 1 further comprising:
    determining that an individual carrying the mobile device has moved past the impediment based on the positional data of the mobile device when neither the sound nor motion of the impediment is detected.

16. The method of claim 15, further comprising:
    generating a door held open event in response to the determination that an individual carrying the mobile device has moved past the impediment based on the positional data of the mobile device and the lack of detection of the sound or motion of the impediment.

17. The method of claim 1, wherein the access control comprises a lock controller and a lock actuator, wherein the lock actuator is controllable to lock and unlock a mechanical or electronic lock.

18. The method of claim 17, further comprising unlocking the lock using the lock actuator in response to the access request.

19. The method of claim 1, further comprising unlocking a lock of the impediment in response to receiving the access request.

* * * * *